(12) United States Patent
Smiley

(10) Patent No.: US 8,544,178 B2
(45) Date of Patent: Oct. 1, 2013

(54) WEED CUTTER AND CHEMICAL APPLICATOR

(76) Inventor: Everett J. Smiley, Oakford, IN (US)

( * ) Notice: Subject to any disclaimer, the term of this patent is extended or adjusted under 35 U.S.C. 154(b) by 259 days.

(21) Appl. No.: 13/136,564

(22) Filed: Aug. 4, 2011

(65) Prior Publication Data
US 2013/0031887 A1    Feb. 7, 2013

(51) Int. Cl.
*A01D 34/02* (2006.01)
*A01D 34/83* (2006.01)
*A01D 34/82* (2006.01)

(52) U.S. Cl.
USPC .......................... 30/123.3; 56/16.8

(58) Field of Classification Search
USPC .......................... 30/123, 123.3; 56/16.8, 17.6
See application file for complete search history.

(56) References Cited

U.S. PATENT DOCUMENTS

| | | | |
|---|---|---|---|
| 3,359,710 A * | 12/1967 | Anderson | 56/16.8 |
| 3,757,194 A | 9/1973 | Weber et al. | |
| 4,219,963 A | 9/1980 | Mullett | |
| 4,926,622 A | 5/1990 | McKee | |
| 5,088,198 A | 2/1992 | Drusiani | |
| 5,237,803 A * | 8/1993 | Domingue, Jr. | 56/16.8 |
| 5,329,752 A * | 7/1994 | Milbourn | 56/16.4 R |
| 5,491,963 A | 2/1996 | Jerez | |
| 5,606,822 A | 3/1997 | Dearhammer | |
| 6,014,836 A | 1/2000 | Chester | |
| 6,125,621 A | 10/2000 | Burch | |
| 6,240,714 B1 | 6/2001 | Shear | |
| 6,374,586 B1 * | 4/2002 | Burch | 56/16.8 |
| 6,497,088 B1 * | 12/2002 | Holley | 56/16.8 |
| 6,820,338 B2 | 11/2004 | Lin | |
| 6,886,256 B2 * | 5/2005 | Hobday et al. | 30/123.3 |
| 6,952,876 B2 * | 10/2005 | Frazer | 30/123.3 |
| 8,359,820 B2 * | 1/2013 | Dohrmann | 56/16.8 |

* cited by examiner

*Primary Examiner* — Hwei C Payer
(74) *Attorney, Agent, or Firm* — Frank D. Lachenmaier

(57) ABSTRACT

The present invention relates generally to an apparatus that chops off a weed at or below ground level and applies a small shot of herbicide to the freshly cut weed base. More particularly the present invention is a rechargeable, battery operated, solenoid driven, and hand held device with a herbicide reservoir on the handle and a reciprocating cutter blade with a directed herbicide spray nozzle at the base.

2 Claims, 5 Drawing Sheets

WEED CUTTER AND CHEMICAL APPLICATOR

BACKGROUND

1. Field of Invention

The present invention relates generally to an apparatus that chops off a weed at or below ground level and applies a small shot of herbicide to the freshly cut weed base. More particularly the present invention is a rechargeable, battery operated, solenoid driven, and hand held device with a herbicide reservoir on the handle and a reciprocating cutter blade with a directed herbicide spray nozzle at the base.

2. Prior Art

There are numerous rotary action blade or cord devices for cutting weeds and some that have herbicide sprayers acting in conjunction with the rotary cutters. These systems, however, do not allow for selectively eradicating individual weeds in the middle of valuable crops or vegetation. Numerous rotary weed cutter devices are currently on the market, some using electric motors with extension cords, others with internal combustion engines and some with rechargeable batteries. None have disclosed a unit that is relatively light weight and easy to move from one place to another and allows the eradication of individual weeds in the midst of valuable crops.

SUMMARY OF THE INVENTION

An object of the Weed Cutter and Chemical Applicator is to provide a system that allows individual weeds to be eradicated without harming contiguous vegetation.

Another object of the Weed Cutter and Chemical Applicator is to provide a system that is relatively light weight and easily repositioned from weed to weed.

Another object of the Weed Cutter and Chemical Applicator is to provide a system that is relatively inexpensive to construct.

Another object of the Weed Cutter and Chemical Applicator is to provide a system that is easy to disassemble into component parts for cleaning, storage and shipping.

Still further objects and advantages will become apparent from a consideration of the ensuing description and accompanying drawings. In the description, reference is made to the accompanying drawings which form a part thereof, and in which are shown, by way of illustration, specific embodiments in which the invention may be practiced. These embodiments will be described in sufficient detail to enable those skilled in the art to practice this invention, and be understood that other embodiments may be utilized and that structural changes may be made without departing from the scope of the invention. In the accompanying drawings, like reference characters designate the same or similar parts throughout the several views.

DRAWINGS

The invention is described with reference to the following drawings.

DESCRIPTION

In order that the invention is fully understood it will now be described by way of the following examples in which Weed Cutter and Chemical Applicator 10 is shown in FIGS. 1-5.

Figure 1:
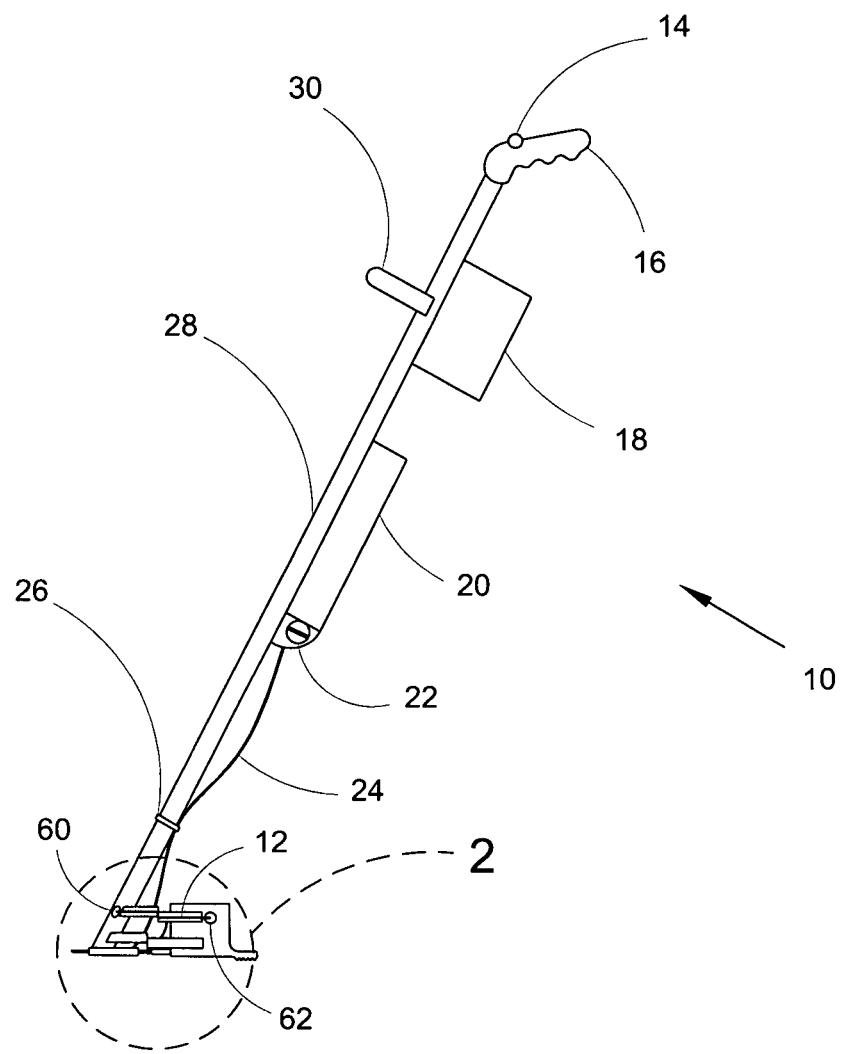
FIG. 1 is a side view of the Weed Cutter and Chemical Applicator.
Figure 2:
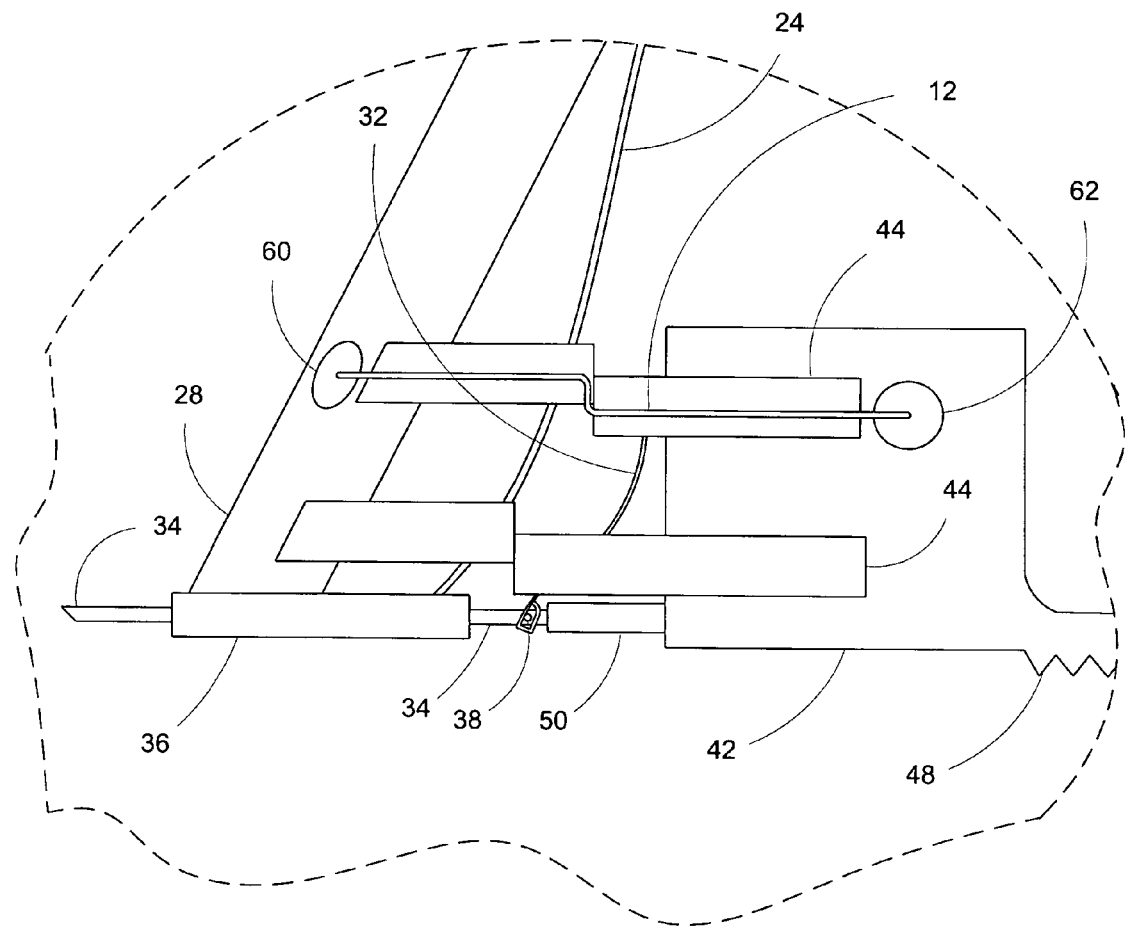
FIG. 2 is a an enlarged partial view thereof.
Figure 3:
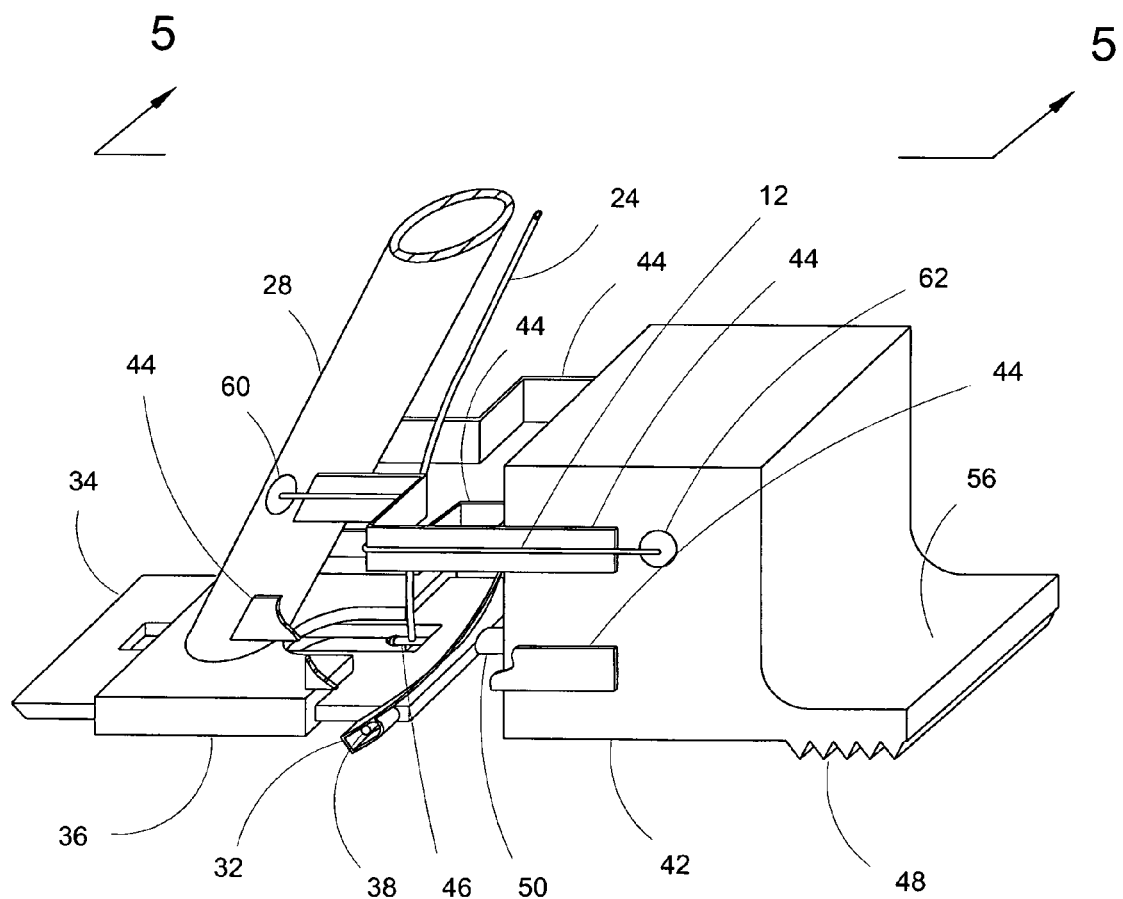
FIG. 3 is a perspective view of cutter assembly in the extended mode.
Figure 4:
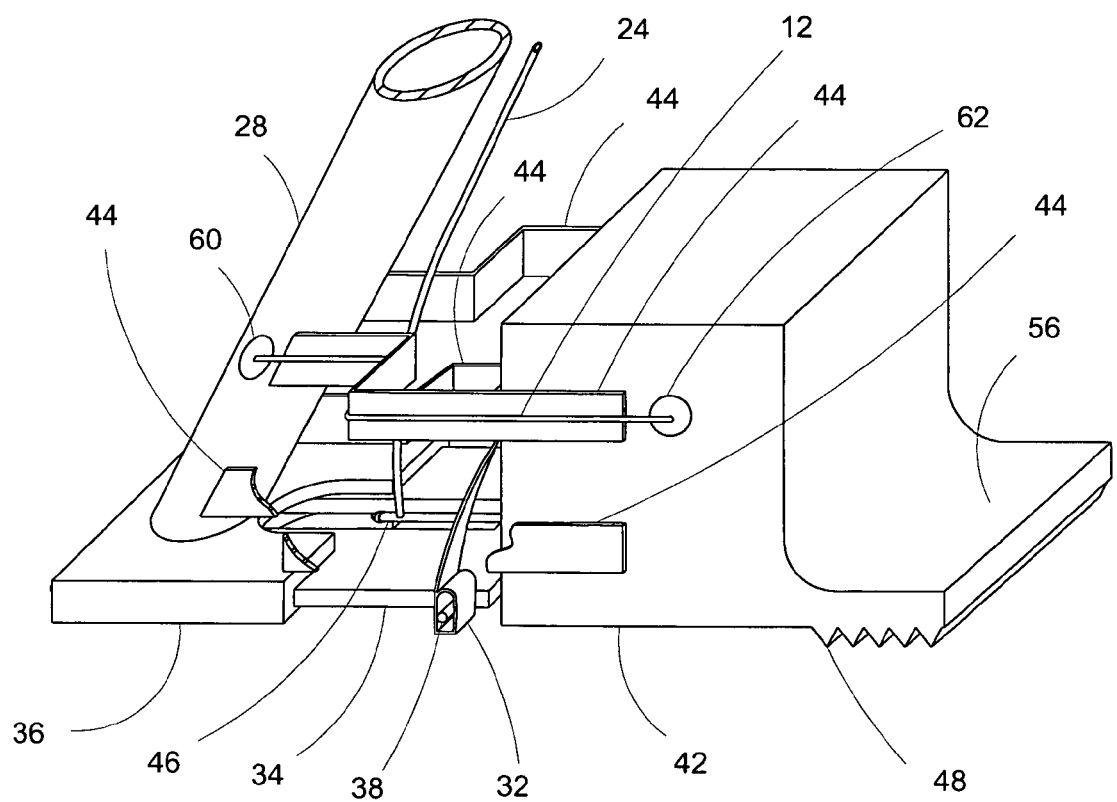
FIG. 4 is a perspective view of cutter assembly in the retracted mode.
Figure 5:
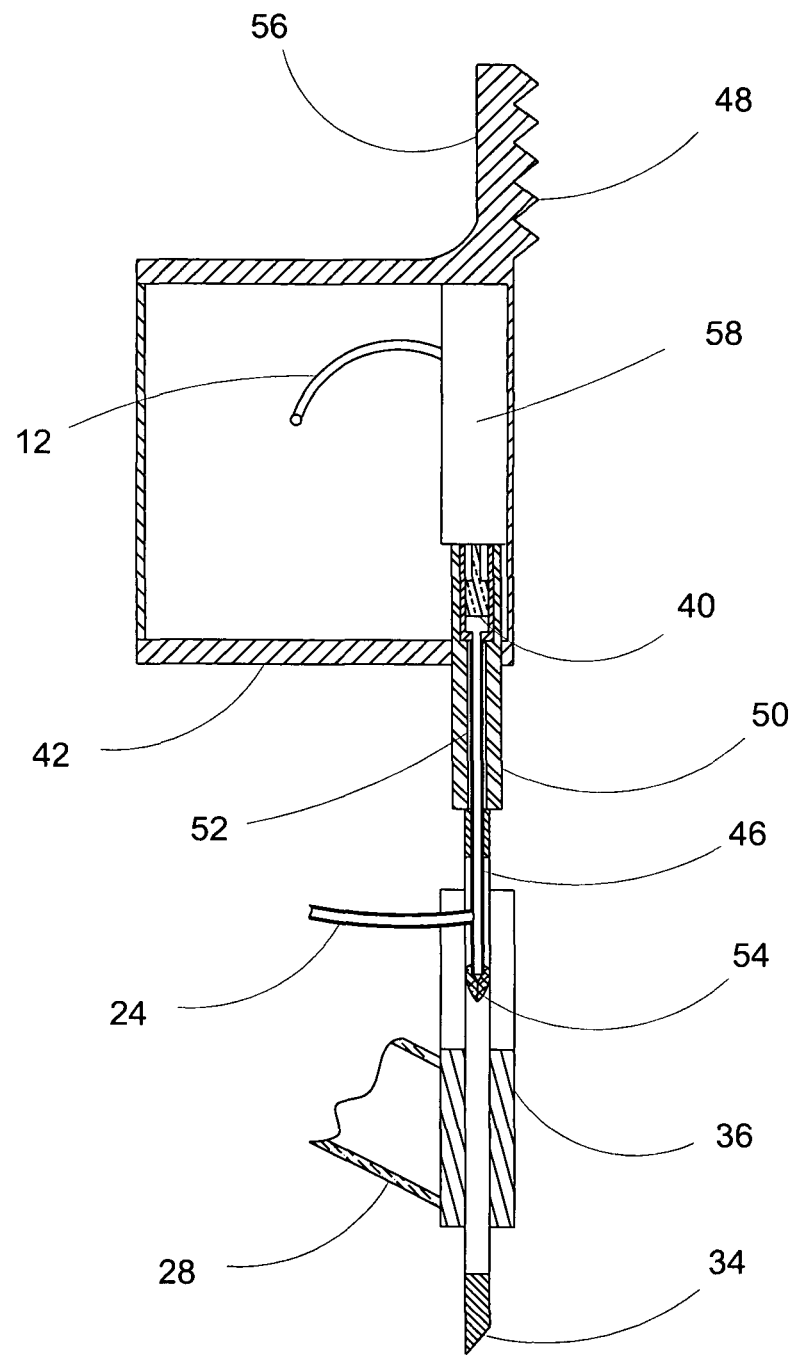
FIG. 5 is a partial section view of cutter assembly taken along cutting plane 5-5 in FIG. 3.

FIG. 1 discloses Weed Cutter and Chemical Applicator 10 in a side elevation view. Tubular frame 28 is preferably approximately 1 inch in diameter and approximately 50 inches long with finger-patterned grip 16 at its proximal end. The distal end of frame 28 is cut off at an approximate angle of 30 degrees from its axis. Finger-patterned grip 16 has firing button 14 mounted to its top side wherein firing button 14 can be easily discharged with the thumb on the hand with fingers engaging grip 16. Approximately 20 inches axially from firing button 14 is mounted device control handle 30. Mounted to frame 28, directly under device control handle 30 is rechargeable battery 18. Current carrying wires 12 run from firing button 14 to rechargeable battery 18 axially down the inside of frame 28 until they exit frame 28 at lower terminus 60. Two set of steel straps 44 are attached to frame 28 toward its distal end at approximately a 30 degree angle to frame 28's axis. Steel straps 44 are formed outward to a width commensurate with side walls of solenoid case 42 where they are attached. Lower terminus 60 is in line with top set of steel straps 44 and when current carrying wire 12 exits terminus 60 it follows steel strap 44 until it reaches solenoid case 42's entrance grommet 62. Current carrying wire 12 enters solenoid case 42 and is connected to single acting solenoid 58.

Herbicide reservoir 20 is mounted at the approximate midpoint in the length of frame 28. Shut-off valve 22 is mounted at the distal end of herbicide reservoir 20. Herbicide feed tube 24 depends from shut-off valve 22 and is attached to frame 28 by connector 26.

Attached to distal end of frame 28 is cutter blade guide 36. Cutter blade guide 36 is approximately 2 inches wide by 2 inches long and is approximately ⅜ inches thick. It has a 1½ inch wide by ⅛ inch high opening from its proximal side to its distal side centered in the height and width dimension. Cutter blade guide 36 also has ¾ inch wide, open-ended to the proximal side, notches in both top and bottom panels centered in the width dimension. The distal ends of these notches are finished with a ⅜ inch radius approximately 1 inch from the distal side. The distal end of frame 28 is attached to the top surface of cutter guide 36 approximately tangent to distal side of cutter guide 36. With the bottom of cutter blade guide 36 held horizontally, frame 28 elevates at the 60 degree angle from the distal end to the finger-patterned grip 16 allowing the user to stand upright while exercising Weed Cutter and Chemical Applicator 10.

Cutter blade 34 is preferably made from hardened tool steel and is approximately 1½ inches wide by 2¼ inches long and ⅛ inch thick. It slip-fits through the ⅛ inch high by 1½ inch wide opening in cutter blade guide 36. The distal end of cutter blade 34 is tapered at approximately a 45 degree angle. Approximately ¼ inch from proximal end of cutter blade 34 are mounted 1/16 inch diameter spring retention pins 38, extending outward approximately 3/16 inch from both sides of cutter blade 34, centered in the ⅛ inch high dimension. Cutter blade 34 also has a ⅜ inch wide rectangular opening running from ¼ inch from proximal end and stopping within approximately ¼ inch from distal end. Through proximal end of cutter blade 34 is a clearance hole approximately 1/16 inch in diameter through which slips 1/16 inch diameter herbicide distribution tube 46. Herbicide distribution tube 46 is approximately 1½ inches long and has a replaceable flexible split tip 54 that snaps over retainer grooves in distal end of herbicide distribution tube 46. Tip 54 is split such that when injection pressure is felt, tip 54 opens and allows a spray of herbicide down cutter blade 34 and onto just-cut weed base. Herbicide feed tube 24 is connected between the exit of shut-off valve 22 and toward the distal end of herbicide distribution tube 46.

Cutter blade drive piston 50 is fastened to proximal end of cutter blade 34 and when firing button 14 is pushed, single acting solenoid 58 is activated, driving cutter blade drive piston 50 forward approximately ¾ of an inch, cutting off a weed. Spring 32 fits over spring retainer pins 38 and attaches to steel support straps 44 on both sides. When cutter blade drive piston 50 is fully extended, spring 32 is in its maximum stress condition and when single acting solenoid 58 drive pressure is released, spring 32 forces cutter blade 34 to return to its at-rest position. A second embodiment would eliminate the return spring 32 and spring retention pins 38 and replace single acting solenoid 58 with a double acting solenoid 58 that would power out and back with each push of firing button 14. Herbicide distribution tube 46 is separated from cutter blade drive piston 50 by lubricious bearing 52. Side walls of herbicide distribution tube 46 flare to form cylinder walls to accommodate herbicide injector piston 40 just after entering solenoid case 42 and are attached to solenoid case 42 such that when solenoid 58 is activated, herbicide injector piston 40 and cutter blade drive piston 50 move forward approximately ¾ inches while herbicide distribution tube 46 remains stationary.

The bottom rear surface of solenoid case 42, has a set of gripping teeth 48 depending from the bottom surface of solenoid case 42. Opposite side from gripping teeth 48 is small toe pressure pad 56 to allow foot pressure to anchor Weed cutter and chemical applicator 10 after setting it adjacent to the weed to be cut, prior to pushing firing button 14.

OPERATION

The operation of Weed Cutter and Chemical Applicator 10 is as follows: place the dominant hand on finger patterned grip 16 and the off hand on device control handle 30. Position Weed Cutter and Chemical Applicator 10 adjacent to weed to be cut and step on toe pressure pad 56 to anchor device in place. Use thumb on dominant hand to press firing button 14, triggering the cutting and chemical application process. Once firing button 14 is pushed solenoid 58 is activated, which fires cutter blade drive piston 50 forward driving cutter blade 34 forward through weed in question. As cutter blade 34 moves forward, herbicide injector piston 40 also moves forward inside the cylinder walls connected at the proximal end of herbicide distribution tube 46, raising the pressure internal to herbicide distribution tube 46 which forces herbicide out through tip 54 spraying herbicide onto the cut stem of the weed in question. As soon as pistons 40 and 50 reach their desired stroke, the solenoid is released and return spring 32 forces cutter blade 34 back to its at rest position and tip 54 closes as soon as the injection pressure is relieved, preventing leakage or seepage of the herbicide in transport or storage. There is also a shut-off valve 22 at the base of herbicide reservoir 20 to further assure no leakage. Again the second embodiment functions in a similar manner except return spring 32 is eliminated and a double acting solenoid 58 performs the return function.

Although this invention has been described by detailing a preferred embodiment it is not intended to be limited to this set of materials and dimensions. Rather, the scope of this invention is defined by the following claims.

What is claimed is:
1. A rechargeable, reciprocating, hand held weed cutter and chemical applicator comprising:
   a tubular frame with an axis, a proximal end, a distal end, a top side, an under side, where said proximal end is cut perpendicular to said axis and said distal end is cut at a 30 degree angle to said axis, with a finger-patterned grip on said proximal end;
   a device controlling handle on said top side approximately located ¼ of the axial length of said tubular frame from said proximal end;
   a firing button located such that when the fingers of a dominant hand are engaged with said finger-patterned grip, said firing button is in reach of an average person's thumb;
   a rechargeable battery mounted on said under side of said tubular frame directly under said device controlling handle with current carrying wires running from said firing button to said rechargeable battery internal to said tubular frame;
   a solenoid case with a proximal side, a distal side, a top side, a bottom side, a toe pressure pad extending proximally away from said proximal side collinear with said bottom side with a plurality of gripping teeth on its bottom side towards said proximal side, where said solenoid case is attached to said tubular frame with two sets of steel straps;
   a single acting solenoid mounted inside said solenoid case, connected to said rechargeable battery with said current carrying wires run out through an entrance grommet of said solenoid case and along one of said steel straps, into said a lower terminus of said tubular frame and up said tubular frame to said rechargeable battery;
   a herbicide reservoir with a top and a bottom end mounted on said under side of said tubular frame at the approximate midpoint between said proximal and distal ends of said tubular frame with a shut-off valve mounted at said bottom end of said herbicide reservoir, with a herbicide feed tube descending from said shut-off valve and held against said tubular frame by a connector;
   a cutter blade guide with a top panel, a bottom panel, a proximal end, a distal end, wherein said top panel of said cutter blade guide is attached to said distal end of said tubular frame and where said top side of said tubular frame is located tangent to said distal end of said cutter blade guide, said cutter blade guide also has an opening that runs from said proximal end of said cutter blade guide to said distal end of said cutter blade guide, centered between the width and height dimensions of said cutter blade guide of a sufficient height and width to allow for a sliding fit between said opening and a cutter blade, wherein said top and bottom panels have slots open ended to said proximal end of said cutter blade guide and radiused at the distal ends of said slots where said radii are tangent to said under side of said tubular frame, wherein said slots leave sufficient material in said top and bottom panels and both sides to adequately guide said cutter blade;
   said cutter blade made from hardened tool steel that slip fits through said opening in said cutter blade guide with a distal end, a proximal end, a top side, and a bottom side, with said distal end of said cutter blade guide tapered at an approximate angle of 45 degrees with a rectangular opening centered in said cutter blade with a clearance hole through the center of said proximal end of said cutter blade into said rectangular opening;

a herbicide distribution tube that slip fits through said clearance hole in said proximal end of said cutter blade with a replaceable flexible split tip that snaps onto a distal end of said herbicide distribution tube such that when pressure is generated in said herbicide distribution tube, said split tip opens allowing for a spray of herbicide into said rectangular opening in said cutter blade and when pressure is relieved said split tip closes, thus sealing leakage from said distal end of said herbicide distribution tube, wherein said herbicide distribution tube remains at a constant diameter until after it passes through a distal wall of a said solenoid case, after entering said solenoid case the diameter of said herbicide distribution tube flares to form the walls of a cylinder which is fixed within said solenoid case;

a herbicide injector piston that fits slidingly within said cylinder such that said herbicide injector piston, when driven by activating said firing button, drives said single acting solenoid to stroke said herbicide injector piston, generating sufficient pressure in said herbicide distribution tube as to open said split tip, spraying herbicide into said rectangular opening;

a cutter blade drive piston is attached to said proximal end of said cutter blade on its distal end and connects to said single acting solenoid mounted in said solenoid case on its proximal end, with a lubricious bushing separating said cutter blade drive piston and said herbicide distribution tube, such that when said firing button is pushed, said single acting solenoid also drives said cutter blade forward while said herbicide distribution tube remains stationary; and a return spring rotationally and slidingly attached to spring retainer pins protruding from sides of said cutter blade and attached to said steel straps just prior to their attachment to said solenoid case, that is stressed when said single acting solenoid drives said cutter blade forward and when said single acting solenoid is no longer engaged, drives said cutter blade drive piston and said herbicide injector piston to return to at-rest position.

2. The rechargeable, reciprocating, hand held weed cutter and chemical applicator of claim 1 wherein said cutter blade drive piston and said herbicide injector piston return to at-rest position, is performed by the return stroke of a double acting solenoid.

* * * * *